(12) United States Patent
Dallapiccola et al.

(10) Patent No.: US 12,129,919 B2
(45) Date of Patent: Oct. 29, 2024

(54) SYSTEMS FOR LUBRICANT DISTRIBUTION

(71) Applicant: DANA ITALIA S.R.L., Trentino (IT)

(72) Inventors: Matteo Dallapiccola, Trento (IT); Pier Paolo Rinaldi, Arco (IT); Mark Slater, Warwickshire (GB)

(73) Assignee: DANA ITALIA S.R.L., Trentino (IT)

( * ) Notice: Subject to any disclaimer, the term of this patent is extended or adjusted under 35 U.S.C. 154(b) by 0 days.

(21) Appl. No.: 18/066,153

(22) Filed: Dec. 14, 2022

(65) Prior Publication Data

US 2024/0200647 A1 Jun. 20, 2024

(51) Int. Cl.
*F16H 57/04* (2010.01)

(52) U.S. Cl.
CPC ..... *F16H 57/0409* (2013.01); *F16H 57/0423* (2013.01)

(58) Field of Classification Search
CPC .......................... F16H 57/0409; F16H 57/0423
See application file for complete search history.

(56) References Cited

U.S. PATENT DOCUMENTS

| | | | | |
|---|---|---|---|---|
| 2,242,195 A * | 5/1941 | Teker | ................. | F16H 57/0427 184/11.1 |
| 3,529,698 A * | 9/1970 | Nelson | ................. | F16H 57/0447 184/6.12 |
| 4,630,711 A * | 12/1986 | Levrai | ................. | F16N 7/28 184/6.12 |
| 4,721,184 A * | 1/1988 | Sowards | ................. | F16N 29/04 184/6.12 |
| 6,299,561 B1 * | 10/2001 | Kramer | ................. | F16H 57/0447 184/6.12 |
| 7,213,682 B2 * | 5/2007 | Gibson | ................. | F16H 57/0421 184/6.12 |
| 8,534,425 B2 * | 9/2013 | Jabs | ................. | F16H 57/0447 184/11.1 |
| 8,672,094 B2 * | 3/2014 | Quehenberger | ..... | F16H 57/0457 184/6.12 |
| 9,568,091 B2 * | 2/2017 | Drill | ................. | F16H 57/0473 |
| 10,167,944 B2 * | 1/2019 | Kwasniewski | ......... | F16H 48/08 |
| 10,859,152 B2 * | 12/2020 | Yu | ................. | F16H 57/0475 |
| 11,181,184 B2 | 11/2021 | Base | | |
| 2008/0128212 A1 * | 6/2008 | Utzat | ................. | F16H 57/0427 192/70.12 |
| 2012/0073403 A1 * | 3/2012 | Perakes | ................. | F16H 57/0409 74/607 |
| 2018/0058569 A1 * | 3/2018 | Slayter | ................. | F16H 57/0434 |
| 2020/0103018 A1 * | 4/2020 | Base | ................. | F16H 57/0424 |

(Continued)

FOREIGN PATENT DOCUMENTS

CN 211175271 U 8/2020

*Primary Examiner* — Michael A Riegelman
(74) *Attorney, Agent, or Firm* — McCoy Russell LLP

(57) ABSTRACT

Methods and systems are provided for a lubricant distribution assembly comprising a rotating component with a recessed circumferentially surrounded by a radially outer section, the radially inners side of which forms a surface of an undercut groove. The lubricant distribution assembly further includes a lubricant sump separated from the rotating component by a wall, a hollow tube that delivers lubricant from the lubricant sump to the lubricant distribution assembly and a lubricant deflector positioned within an upper portion of the lubricant distribution assembly and which lies in a plane that is parallel to a first axial side of the rotating component.

6 Claims, 7 Drawing Sheets

(56) References Cited

U.S. PATENT DOCUMENTS

| | | | |
|---|---|---|---|
| 2020/0325979 A1* | 10/2020 | Gravina | F16H 57/082 |
| 2021/0293324 A1* | 9/2021 | Goni | F16H 57/0423 |
| 2022/0003135 A1* | 1/2022 | Rinaldi | F16H 57/0453 |
| 2022/0042591 A1* | 2/2022 | Yu | F16H 57/045 |
| 2022/0154879 A1* | 5/2022 | Zendri | F16N 21/02 |
| 2022/0235711 A1* | 7/2022 | Becoulet | F16H 57/082 |

* cited by examiner

SYSTEMS FOR LUBRICANT DISTRIBUTION

TECHNICAL FIELD

The present description relates generally to systems and methods for distribution of lubrication oil from a sump.

BACKGROUND AND SUMMARY

Frequently, mechanical systems use a rotating component such as a gear, pulley, flywheel, or such, partially submerged in a lubrication oil reservoir (e.g., a sump) to distribute the lubrication oil by a scattering action from the rotating component as it rotates into and out of the sump. Such systems have the advantage of being robust and having a high reliability.

However, the inventors herein have recognized issues with the above system. To lubricate parts distant from or not directly in a line of sight of the rotating component, the rotating component may distribute an excess of oil to closer, more direct components in order to ensure oil also reaches the distant, obscured component. A power demand of the system may therefore be increased to move the rotating component at a desired speed to distribute the oil more evenly, decreasing an overall efficiency of the system. Additionally, increasing the velocity of the rotating component may keep fluid away from the surface of the rotating component, thus hampering lubricant oil distribution and causing some components to not receive adequate lubrication. Further, in an example where the rotating component is included a transmission of a vehicle, a high pitch line velocity may generate windage which may keep fluid away from the surface of the rotating component, thereby hampering splashing generation and decreasing an amount of lubricant oil distributed. Decreasing an amount of power loss caused by inadequate lubrication of the transmission may be significant when improving driveline efficiency for electric vehicles.

In one example, the issues described above may be at least partially addressed by a lubricant distribution assembly, comprising: a rotating component with a recessed area, the recessed area axially circumferentially surrounded by a radially outer section, wherein a radially inner side of the radially outer section forms a surface of an undercut groove; a lubricant sump separated from the rotating component by a wall; a hollow tube that delivers a lubricant from the lubricant sump to a lower portion of the lubricant distribution assembly with respect to gravity; and a lubricant deflector positioned within an upper portion of the lubricant distribution assembly with respect to gravity, wherein the lubricant deflector lies in a plane that is parallel to a first axial side of the rotating component. In this way, lubricant may be distributed by a rotating component may reach obscured components even when rotating at lower speed thereby decreasing scattering of excess lubricant. Decreasing scattering of excess lubricant may increase an overall efficiency of the system being lubricated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2A:
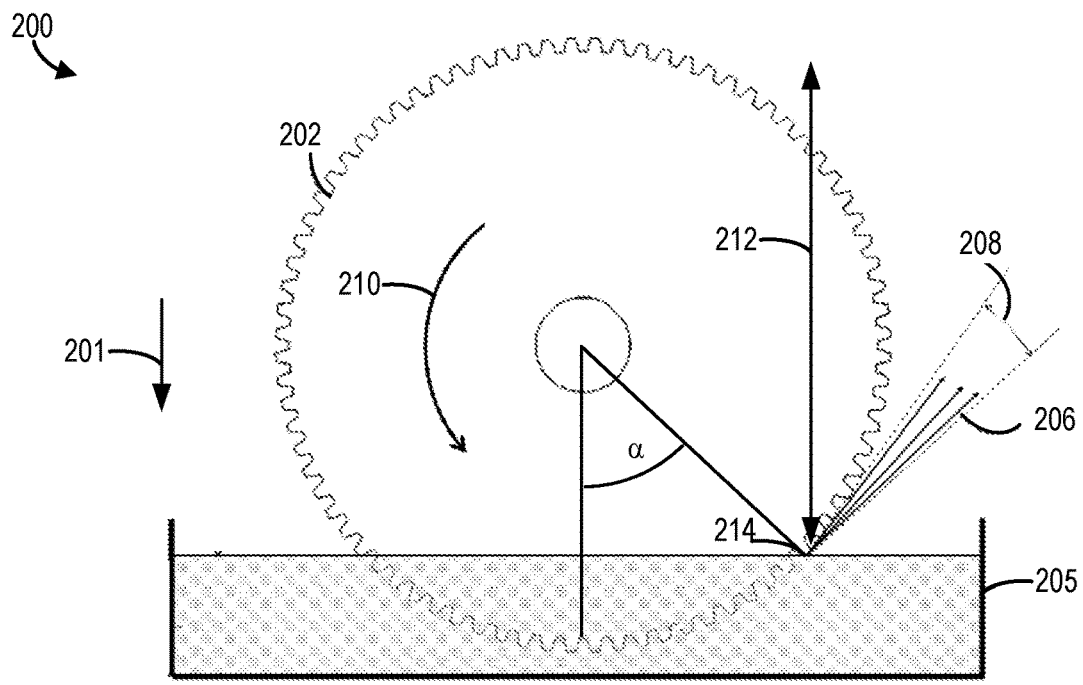
FIG. 2A shows an illustration of an example of conventional lubricant distribution from a lubricant sump, as prior art.
Figure 2B:
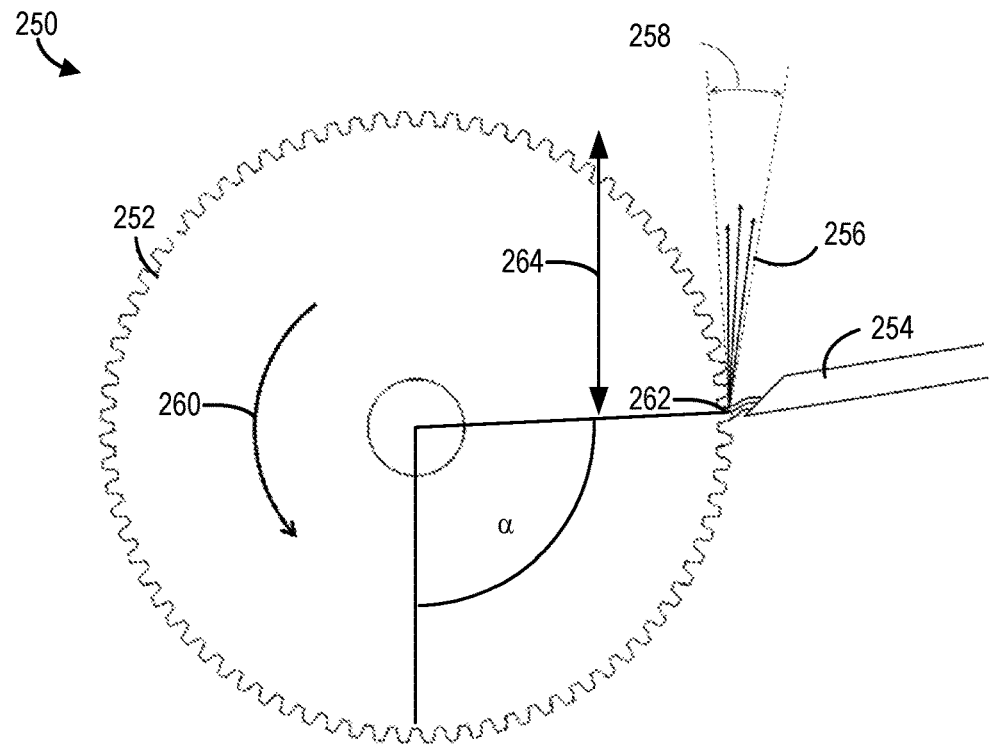
FIG. 2B shows an illustration of an example of conventional lubricant distribution from a lubricant conveyor, as prior art.
Figure 3:
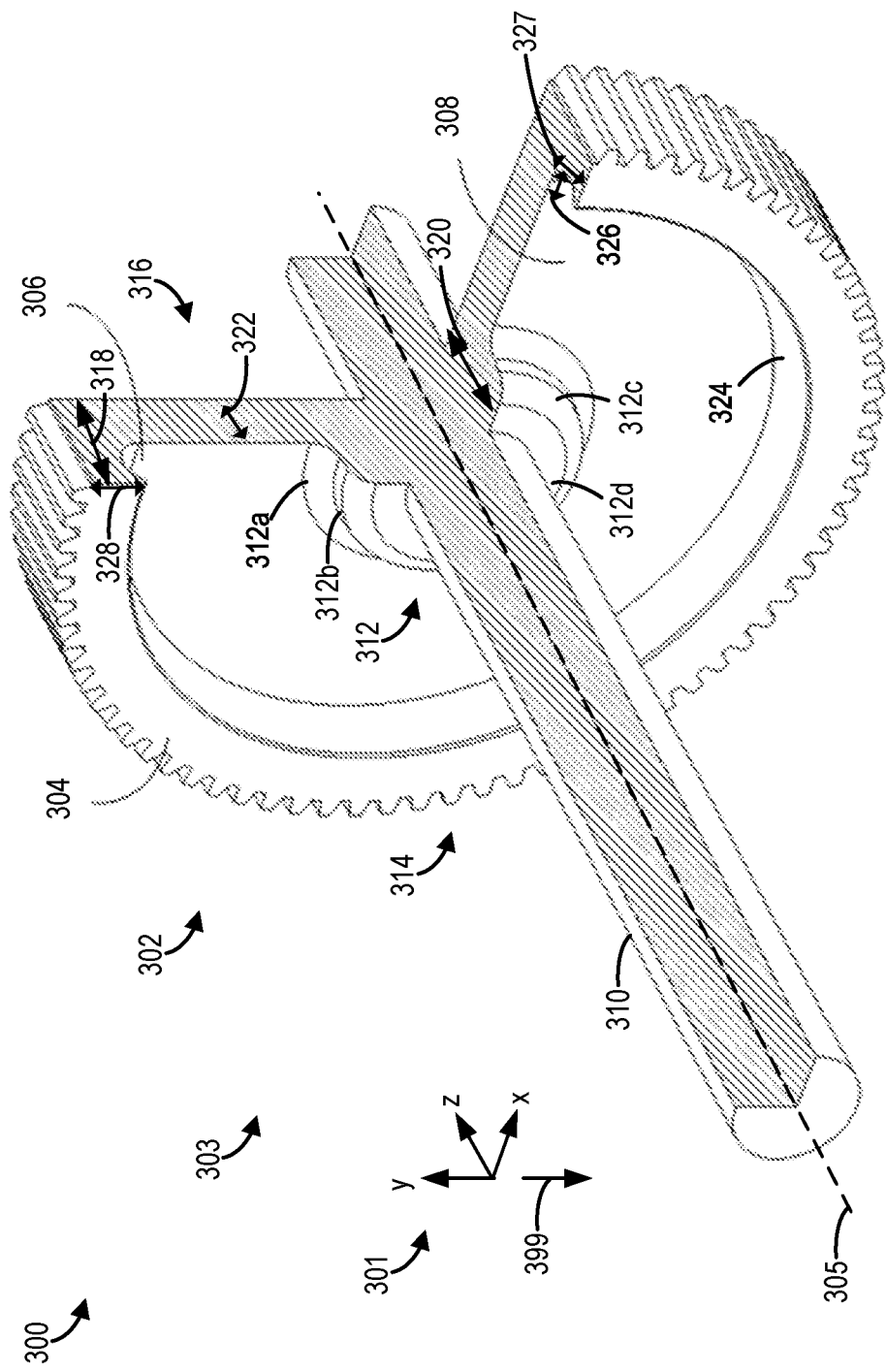
FIG. 3 shows a cut-away illustration of a lubricant distribution assembly.
Figure 4:
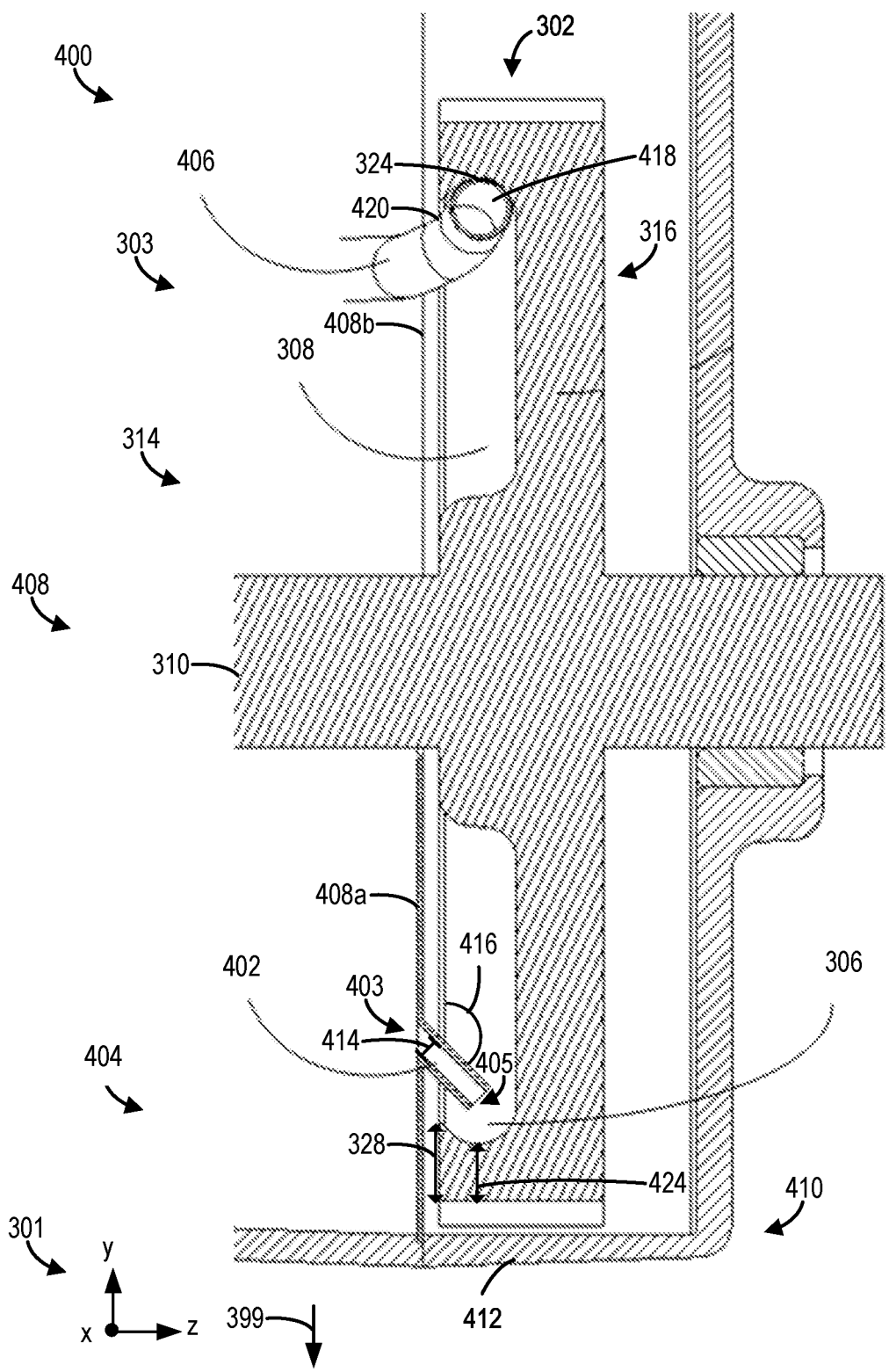
FIG. 4 shows an illustration of a side view of the lubricant distribution assembly.
Figure 5:
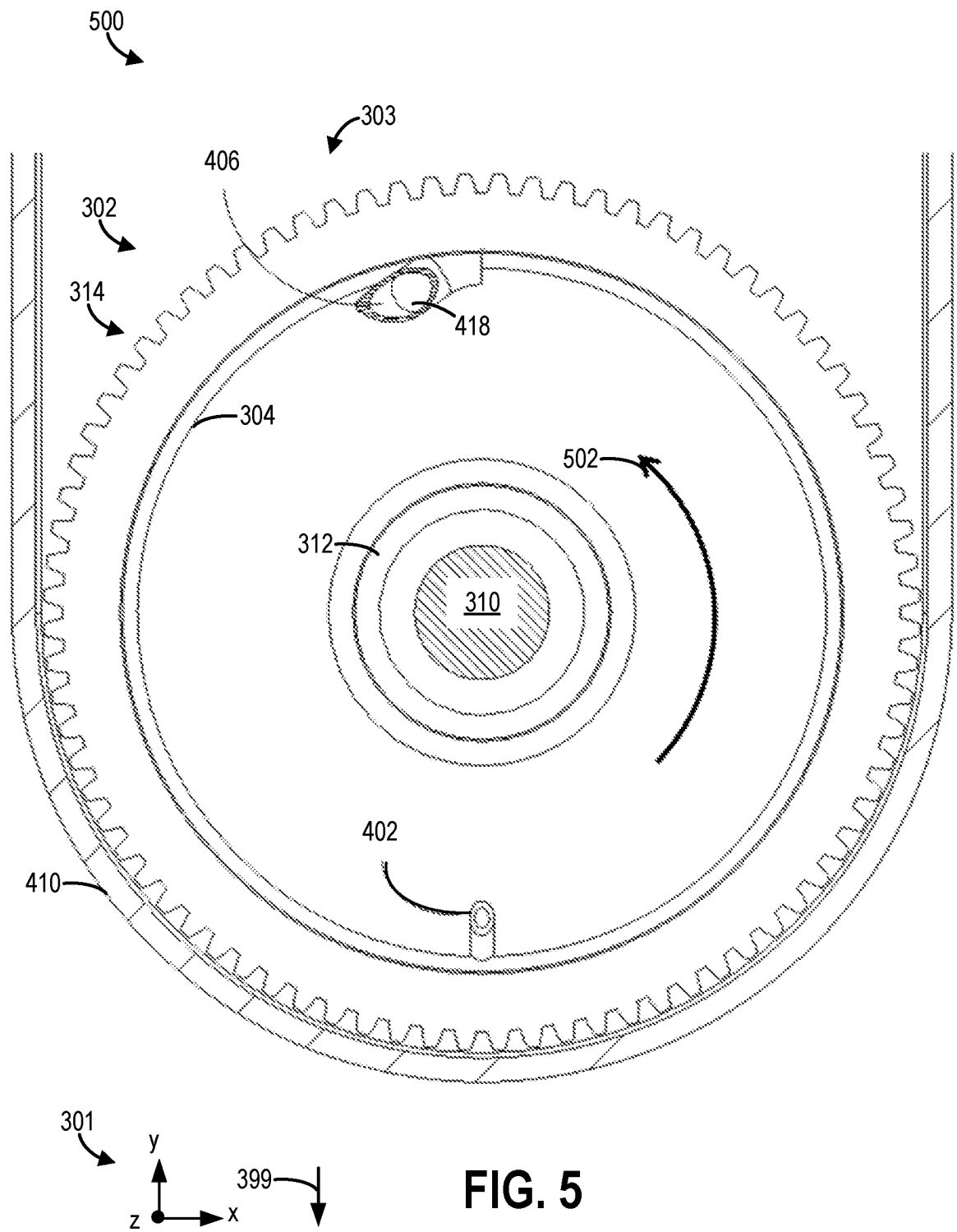
FIG. 5 shows an illustration of a front view of the lubricant distribution assembly.
Figure 6B:
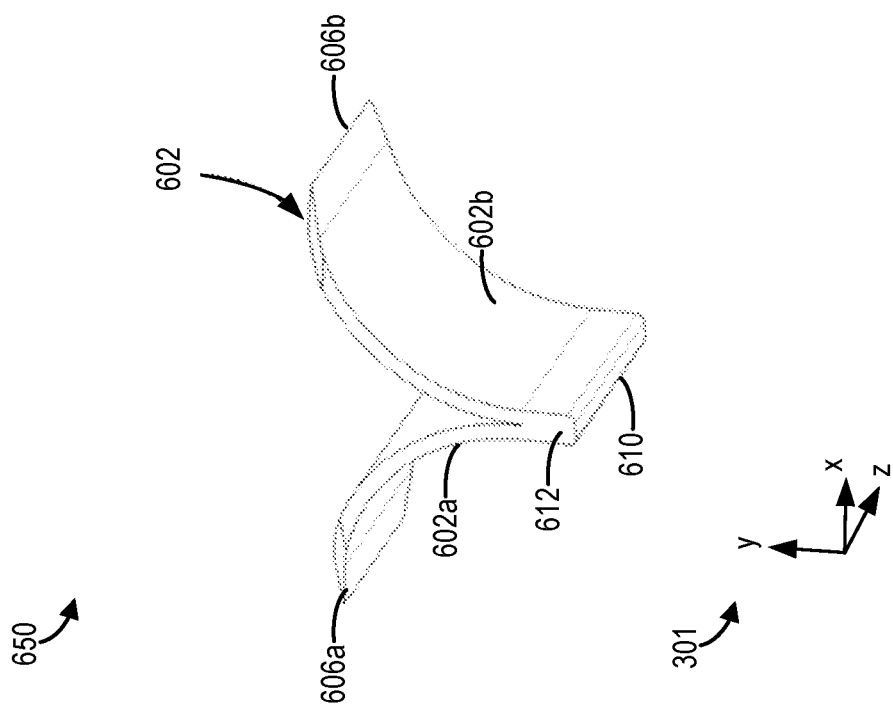
FIG. 6B shows an illustration of a perspective view of the baffle.
Figure 6A:
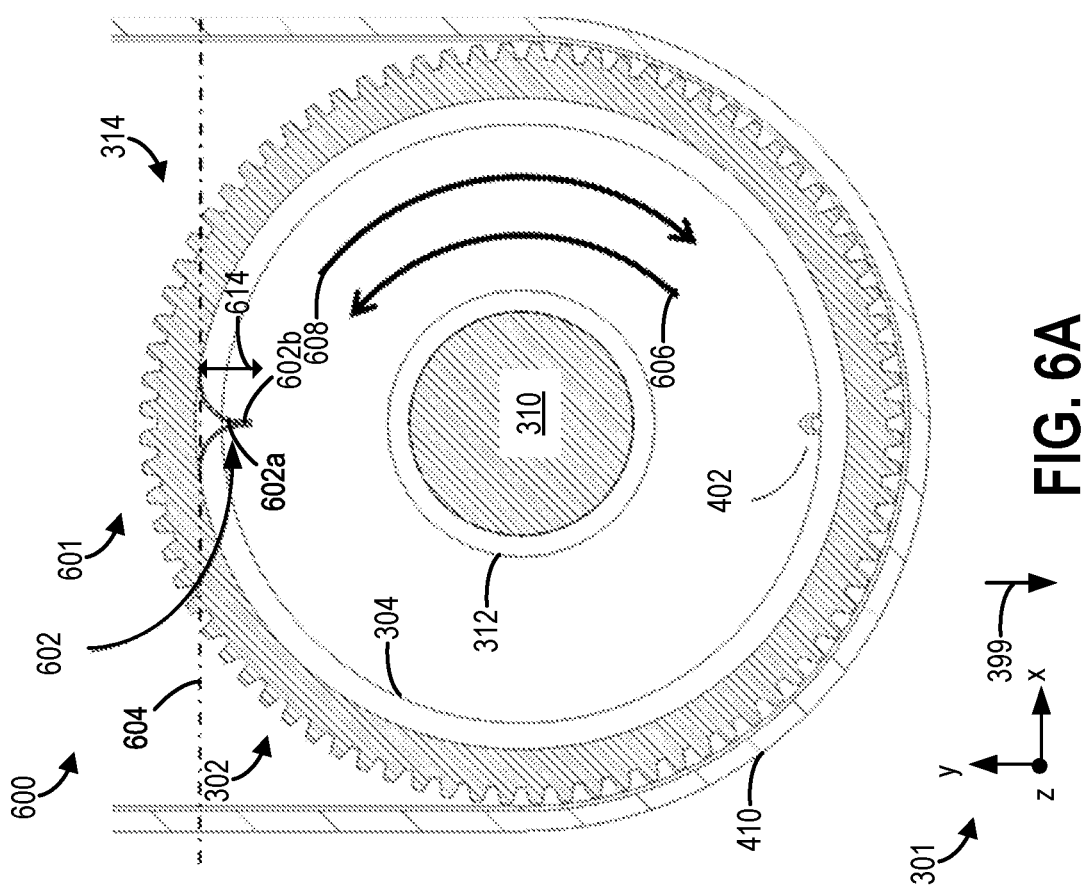
FIG. 6A shows an illustration of a front view of an alternate embodiment of a lubricant distribution assembly including a baffle.
Figure 7:
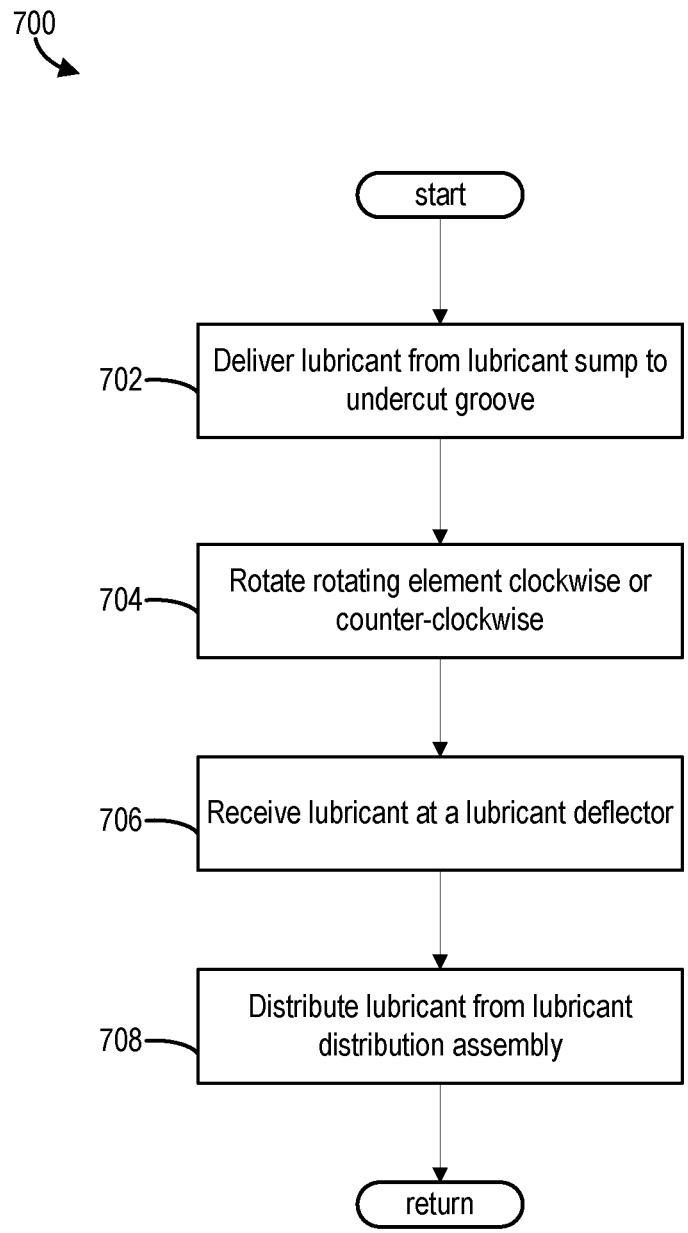
FIG. 7 shows a flowchart of an example of a method for operating a lubricant distribution assembly.

The following description relates to systems and methods for oil distribution using a lubricant distribution assembly. The lubricant distribution assembly may be included in a vehicle such as vehicle 10 described in FIG. 1. The vehicle may include a rotating component, where the rotating component is a component of a system of the vehicle that rotates during a functioning of the component. The rotating component may rotate around a central axis by at least 180° during operation of the system. As non-limiting examples, the rotating component may be a gear, or a flywheel, or a pulley, or a different kind of rotating component. A minimum angular speed may be calculated for a rotating component to distribute lubricant to a height that is even with a top portion of the rotating component. The lubricant may be distributed from an edge of the rotating component, where the minimum angular speed may depend on an angle between a bottom edge (e.g., with respect to gravity) of the rotating component and a point on the rotating component from which the lubricant is distributed. An example of lubricant distribution from immersion of the bottom edge of the rotating component immersed in a lubricant sump is shown in FIG. 2A, and an example of lubricant distribution from a lubricant conveyor is shown in FIG. 2B. The minimum angular speed may be decreased by directing a flow of the lubricant via an undercut groove in the rotating component as shown in FIG. 3. The lubricant distribution assembly may include a lubricant sump separated from the rotating component by a wall, as illustrated by the side view of the lubricant distribution assembly shown in FIG. 4 and the front view of the lubricant distribution assembly shown in FIG. 5. The lubricant distribution assembly may further include a lubricant deflector. The lubricant deflector may be an oil distribution tube, as shown in FIGS. 4-5, or a baffle, as shown in FIGS. 6A-6B. An example of a method for operating the lubricant distribution assembly is shown in FIG. 7.

Figure 1:
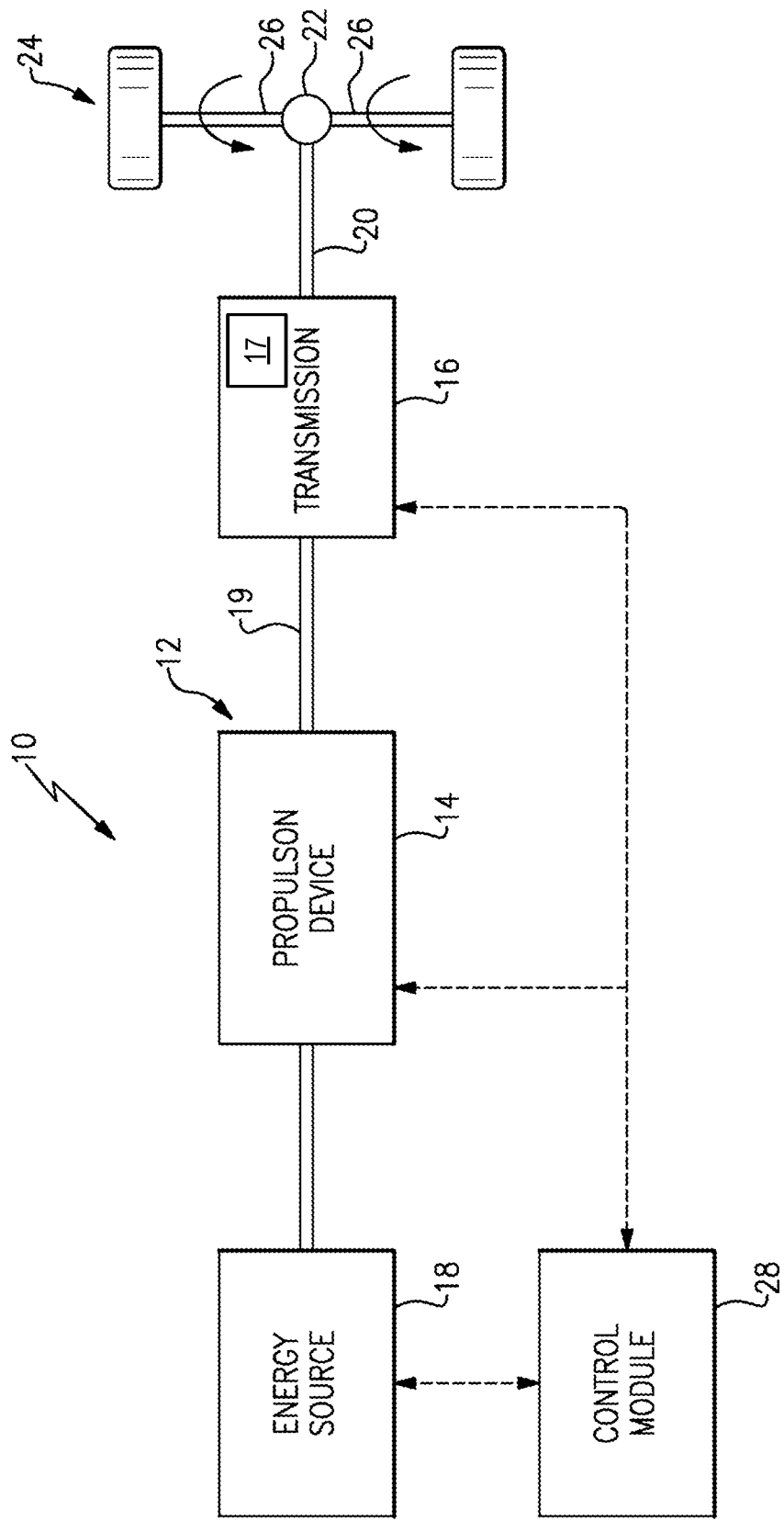
FIG. 1 shows a schematic of a vehicle comprising wheels coupled to drive shafts.

Turning now to FIG. 1, FIG. 1 schematically illustrates a vehicle 10. This disclosure is applicable to many types of vehicle. For example, the vehicle 10 could be a conventional vehicle that is powered by an internal combustion engine, or could be an electrified vehicle that utilizes one or more electric machines in addition to, or as an alternative to, an engine. Additionally, vehicle 10 may be a non-limiting example of a system which may include a rotating component with an undercut groove. Other systems using a passive rotating component to distribute lubrication oil from a sump are considered within a scope of the disclosure.

The exemplary vehicle 10 includes a powertrain 12. The powertrain 12 may include a propulsion device 14 and a transmission 16 that is selectively driven by the propulsion device 14. The propulsion device 14 may be employed as an available drive source for the vehicle 10. For example, the propulsion device 14 could include an engine for a conventional vehicle, or an electric machine (e.g., an electric motor, a generator or a combined motor/generator) for an electrified vehicle.

The transmission 16 may include a gearbox having multiple gear sets (not shown) that are selectively operated using different gear ratios by selective engagement of friction components such as clutches and brakes (not shown) to establish the desired multiple discrete or step drive ratios. One or more of the gears of transmission 16 may be configured to passively distribute lubricant from a sump to components of the transmission. The one or more gears may include a lubricant distribution assembly 17 including an undercut groove configured to efficiently move lubricant from a lower portion of the lubricant distribution assembly to an upper portion of the lubrication distribution assembly at low radial speeds. Lubricant distribution assembly 17 including the undercut groove is described further below with respect to FIGS. 3-6B. Efficiently distributing lubricant (e.g., lubrication oil) at low radial speeds may reduce an amount of excess lubricant scattered throughout transmission 16 while still ensuring lubricant reaches the desired components of transmission 16. In this way, sufficient lubrication of each component of transmission 16 may be ensured while also increasing an efficiency of transmission 16.

The friction components are controllable through a shift schedule that connects and disconnects certain components of the gear sets to control the ratio between a transmission input shaft 19 and a transmission output shaft 20. The transmission 16 may alternatively be controlled to achieve an infinite number of ratios. These ratios can be achieved through mechanical reconfiguration, as in a continuously variable transmission (CVT), or by electrical coordinate of the speeds of electric machines, as in an electrically continuously variable transmission (eCVT). The transmission 16 may be automatically shifted from one ratio to another based on various vehicle and ambient operating conditions by an associated controller 28. The transmission 16 then provides powertrain output torque to the transmission output shaft 20. The transmission output shaft 20 may be connected to a differential 22. The differential 22 drives a pair of wheels 24 via respective axles 26 that are connected to the differential 22 to propel the vehicle 10.

An energy source 18 may supply power to the propulsion device 14. The energy source 18 may be a fuel system in embodiments where the propulsion device 14 is an engine, or a high voltage battery in embodiments where the propulsion device 14 is an electric machine. For example, an engine is configured to consume fuel (e.g., gasoline, diesel, etc.) to produce a motor output, whereas the high voltage battery is configured to output and receive electrical energy that is consumed by the electric machine to produce a motor output.

The powertrain 12 of the vehicle 10 may additionally include an associated controller 28. While schematically illustrated as a single module, the controller 28 may be part of a larger control system and may be controlled by various other controllers throughout the vehicle 10, such as a vehicle system controller (VSC) that includes a powertrain control unit, a transmission control unit, engine control unit, etc. It may therefore be understood that the controller 28 and one or more other controllers can collectively be referred to as a "control module" that controls, such as through a plurality of integrated algorithms, various actuators in response to signals from various sensors to control functions associated with the vehicle 10. In one embodiment, the various controllers that make up the VSC may communicate with one another using a common bus protocol (e.g., CAN).

The controller 28 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 28 to control the vehicle 10.

The controller 28 may also communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

As schematically illustrated in FIG. 1, the controller 28 may communicate signals to and/or from the propulsion device 14, the transmission 16, and the energy source 18. In other words, these devices are in electrical communication with one another. Although not explicitly illustrated, those of ordinary skill in the art will recognize various functions or components that may be controlled by the controller 28 within each of the subsystems identified above.

The control logic stored on the controller 28 may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices that utilize electric, magnetic, and/or optical storage to keep executable instructions and associated calibration information, operating variables, and the like.

Turning now to FIG. 2A, an illustration 200 of a conventional rotating component 202 of a lubricant distribution assembly is shown, as prior art. A direction of gravity in illustration 200 is shown by arrow 201 for reference. Rotating component 202 may include multiple teeth and may also be referred to as gear 202. Gear 202 may be positioned so that a lower portion of gear 202 with respect to gravity is submerged in lubricant held within sump 205. In one example, gear 202 may rotate in a counter-clockwise direction as indicated by arrow 210 and lubricant may be propelled by teeth of gear 202 in a direction indicated by arrow 206 (e.g., tangent to a circumference of gear 202). The lubricant propelled by gear 202 may spread over an angle 208. For the lubricant to reach a plurality of components positioned in an enclosed space (e.g., a gearbox) including gear 202, gear 202 may be configured to distribute lubrication oil to a distance 212 above the surface of lubricant oil in sump 205. Distance 212 may correspond to a distance from a point 214 where lubricant leaves gear 202 to the top (e.g., with respect to gravity) of gear 202.

By using equations of motion, a minimum angular speed demanded of gear 202 to distribute lubricant a distance 212 given by equation 1 below may be calculated.

$$\omega = \sqrt{\frac{2 \cdot g}{r \cdot (1 - \cos \alpha)}} \quad (1)$$

where $\omega$ is angular speed of gear 202, g is the gravitational constant, r is a radius of the rotating component (e.g., gear), and $\alpha$ is an angle between a bottom (e.g., with respect to gravity) of the rotating component (e.g., gear 202) and a point on the circumference of the rotating component from which lubricant is distributed (e.g., point 214). As described by equation 1, minimum angular speed may decrease as $\alpha$ increases. As described above, decreasing the minimum angular speed may be desired due to an increased effectiveness of the lubricant distribution system, thereby decreasing an amount of excess oil moved (e.g., splashed) by the lubricant distribution system. In this way, the efficiency of the system including the lubricant distribution system (e.g., a transmission) may be increased. Conventionally, solutions have included adjusting the minimum angular speed by adjusting $\alpha$. An example where $\alpha$ is adjusting using an oil conveyor is shown in FIG. 2B.

FIG. 2B shows an illustration 250 of a second conventional gear 252, as shown in the prior art, positioned in close proximity to an oil conveyor 254. Oil conveyor 254 may be positioned to deliver lubricant to a point 262 on gear 252. Lubricant may be scattered by gear 252 in a direction indicated by arrows 256 when gear 252 rotates in a counter-clockwise direction as indicated by arrow 260, thereby spreading oil at an angle 258. By introducing lubricant using oil conveyor 254, $\alpha$ may be practically increased compared to usage of a sump as shown in FIG. 2A. Equation 1 may be used to calculate a minimum radial speed of gear 252 demanded for distributing lubricant oil to a height 264, where height 264 is equivalent to a distance between point 262 and a top of gear 252. For example, if gear 252 has a diameter equal to 300 mm, equation 1 predicts that for an $\alpha$ of around 90° as shown in FIG. 2B a minimum angular speed would be 110 rotations per minute (rpm). However, increasing $\alpha$ to reach a minimum angular speed of 110 rpm still demand an increased lubricant level and may still splash excess oil, thereby decreasing an efficiency of the system which includes gear 202 or gear 252 (e.g., a transmission such as transmission 16 of FIG. 1). Instead, a rotational component configured to deliver lubricant at a decreased minimum angular speed which is independent of an oil sump level or position may be desired. The minimum angular speed may be decreased by a lubricant distribution assembly described further below with respect to FIGS. 3-6B. The lubricant distribution assembly may be configured to transport lubricant upwards at a minimum angular speed which is independent of $\alpha$ and therefore an oil level demand for the lubricant distribution assembly may be decreased.

Turning now to FIG. 3, a cut-away view 300 is shown of a rotating component 302 of a lubricant distribution assembly 303 such as lubricant distribution assembly 17 of FIG. 1. Also shown in FIG. 3 is a coordinate system 301 including an x-axis, y-axis, and z-axis is shown for a comparison between view in FIGS. 3-6B. The z-axis may be parallel to an axis of ration of rotating component 302 and along the z-axis may refer to an axial direction. The y-axis may be parallel to a vertical axis and the x-axis may be parallel to a horizontal axis. Further, a gravitational axis 399 is shown corresponding to a direction of gravity.

In some examples, rotating component 302 may be a gear of a transmission. Rotating component 302 may be configured to rotate about rotational axis 305. A spindle 310 may be positioned at a radial center of rotating component 302. Spindle 310 may be positioned parallel to the z-axis. In some examples, spindle 310 may be fixedly coupled to rotating component 302 and rotating component 302 and spindle 310 may rotate in unison. In alternate examples, spindle 310 may not be fixedly coupled to rotating component 302 and rotating component 302 may rotate around spindle 310. In an example where rotating component 302 is a transmission gear, spindle 310 may be an input shaft or an output shaft.

Rotating component 302 may include a recessed area 308 positioned on a first axial side 314 of rotating component 302. A second axial side 316, opposite first axial side 314 along the z-axis may not include a recessed area. Recessed area 308 may be axially circumferentially bounded by a radially inner section 312 and a radially outer section 304. Additionally, radially inner section 312 may be axially circumferentially bound a radially outer surface of spindle 310.

Radially outer section 304 may be a maximum thickness 318 along the z-axis while radially inner section 312 may be a maximum thickness 320 along the z-axis. In one embodiment maximum thickness 318 may be equal to maximum thickness 320. In alternate embodiments, maximum thickness 320 and maximum thickness 318 may be different thicknesses.

Radially inner section 312 may include a first curved section 312a, a flat section 312b, a second curved section 312c and an end section 312d. First curved section 312a may be a radially outermost section of radially inner section 312 and positioned furthest in a radial direction from spindle 310. First curved section 312a may be curved in a concave manner when viewed along a radius of rotating component 302. Flat section 312b may positioned radially adjacent to first section 312a on a radially inner side of first curved section 312a. Flat section 312b may be flat when viewed along the radius of rotating component 302 and may extend axially between first curved section 312a and second curved section 312c, parallel to the z-axis. Second curved section 312c may be positioned radially adjacent to flat section 312b on a radially inner side of flat section 312b. Second curved section 312c may be curved in a convex manner when viewed along the radius of rotating component 302. End section 312d may be positioned radially adjacent to second curved section 312c on a radially inner side of second curved section 312c. End section 312d may be flat when viewed axially (e.g., along the z-axis). In some examples, end section 312d may comprise an axially outer face of second curved section 312c.

First axial side 314 includes an undercut groove 306, a surface 324 of undercut groove 306 formed by radially outer section 304. Undercut groove 306 may be circumferentially surrounded by a radially inner side (e.g., a side facing radially inner section 312) of radially outer section 304. A maximum axial width 327 of undercut groove 306 may be equivalent to a difference between a maximum thickness 318 of radially outer section 304 and a maximum thickness 322 of rotating component 302 in an area radially between radially outer section 304 and radially inner section 312. In one example a maximum axial width 327 of undercut groove 306 may be equivalent to between one sixth and one third of maximum thickness 318 of radially outer section 304. A maximum radial depth 326 may be a fraction of a maximum radial length 328 of radially outer section 304. Further, the maximum radial depth 326 of undercut groove 306 may be between one half and one third the maximum radial length 328 of radially outer section 304.

In one example a radial profile of undercut groove 306 may be U-shaped. Said another way, surface 324 of undercut groove 306 may form a concave arc when viewed in a radially outward (e.g., away from axis of rotation 305) direction. The U-shape may be described further below with respect to FIG. 4. Further, other profiles of undercut groove 306 have been considered. In one example, the radial profile of undercut groove 306 may be chosen according to an case of manufacturing of undercut groove 306.

In one example, lubricant may be positioned within a portion of undercut groove 306. Rotation of rotating component 302 around rotational axis 305 may result in transporting lubricant in a direction of rotation of rotating component 302. In such an example, centrifugal force pressing lubricating oil against surface 324 of undercut groove 306 may be greater than gravitational force acting in a direction indicated by gravitational axis 399. In this way, transportation of lubricant from a lower portion of lubricant distribution assembly 303 to an upper portion of lubricant distribution assembly 303 (with respect to the y-axis) may depend on an angular speed and a radius of rotating component 302 and not on an angle (e.g., alpha) at which the lubricating oil is introduced to an edge of rotating component 302. As one example, the minimum angular speed of rotating component 302 demanded to transport lubricant oil within undercut groove 306 from a bottom portion of lubricant distribution assembly 303 to an upper portion of lubricant distribution assembly 303 may be calculated using equation 2.

$$\omega = \sqrt{\frac{g}{r}} \quad (2)$$

As one example, a diameter of rotating component 302 may be 300 mm. In such an example, a minimum angular speed of rotating component 302 to transport lubricant oil to an upper portion of the lubricant distribution assembly may be 77 rpm. Comparing the example of rotating component 302 to the example given above with respect to FIG. 2B including a rotating component of the same diameter but without an undercut groove, minimum angular speed may be decreased by approximately 30%. In an example where lubricant distribution assembly 303 is positioned in a transmission of a vehicle (e.g., transmission 16), effective lubrication may be achieved starting at angular speeds 30% lower than the example shown in FIG. 2B. Further, if rotating component 302 is rotating at speed below the minimum angular speed, lubricant may fall back through recessed and area 308 and back into a portion of undercut groove 306. In this way, excess scattering of lubricant at lower angular speeds may be reduced.

Turning now to FIG. 4, a cross sectional view 400 of lubricant distribution assembly 303 is shown. Cross sectional view 400 may include additional components configured to distribute lubricant. In one example a wall 408 may separate a lubricant sump 404 from first axial side 314 of rotating component 302. Further, wall 408 may be a sole barrier between lubricant sump 404 and rotating component 302. In one example, a left side of wall 408 (e.g., with respect to the z-axis) may include a wet lubricant sump and a right side of wall 408 may include a dry lubricant sump. Wall 408 may be perpendicular to a base 412 of a housing 410 and parallel to first axial side 314 of rotating component 302. Housing 410 may enclose lubricant distribution assembly 303 and lubricant sump 404. Wall 408 may include a lower portion 408a positioned below spindle 310 (e.g., along the y-axis with respect to gravity) and an upper portion 408b positioned above spindle 310.

A hollow tube 402 may fluidly couple lubricant sump 404 to undercut groove 306. Further, hollow tube 402 may be configured to deliver lubricant from lubricant sump to undercut groove 306. In one example, hollow tube 402 may be circular when viewed along the z-axis. Hollow tube 402 may include a first end 403 and as second end 405. First end 403 may be axially opposite second end 405. In on embodiment first end 403 of hollow tube 402 may be flush with wall 408. Additionally, second end 405 may extend past a right face (e.g., with respect to the z-axis) of wall 408 and may be positioned vertically above undercut groove 306. An inner radial diameter 414 hollow tube 402 may be selected based on a desired flow rate for lubricant into undercut groove 306. Hollow tube 402 may be positioned within lower portion 408a of wall 408. A level of lubricant in lubricant sump 404 may be higher than a vertical (e.g., along the y-axis) height of a first end of hollow tube 402. In on example, hollow tube 402 may be positioned within recessed area 308 and spaced away from undercut groove 306. Hollow tube may be tilted downward (with respect to gravity) at an angle 416. In one example, angle 416 may be greater than 90 degrees. Further, hollow tube 402 may be configured to deliver lubricant to a lower portion of lubricant distribution assembly 303 (e.g., a portion below spindle 310, with respect to the gravitational axis).

Rotation of rotating component 302 may transport lubricant held in undercut groove 306 from the lower portion of lubricant distribution assembly 303 to and upper portion of lubricant distribution assembly 303 (e.g., a portion above spindle 310 with respect to the y-axis), thereby bringing lubricant into contact with a lubricant deflector which may lie in a plane parallel with first axial side 314. In one example the lubricant deflector may be tube-shaped and may be referred to as a distribution tube 406. Distribution tube 406 may be positioned within an upper portion 408b of wall 408. Distribution tube 406 may be physically coupled to housing 410 or upper portion 408b of wall 408. In one example, at least a portion of distribution tube 406 may be positioned within undercut groove 306. Further, a portion of a radially outer surface of distribution tube 406 may be at a minimum functional clearance of inner surface 324 of undercut groove 306. In one example, the minimum functional clearance may be 0.3 mm. An open portion 420 of distribution tube 406 may receive lubricant from undercut groove 306 and direct lubricant through distribution tube and out of opening 418 and away from rotating component 302, thereby distributing lubricant to components surrounding rotating component 302. In some examples, lubricant distributed from distribution tube 406 to components positioned behind (e.g., closer to second axial side 316) rotating component 302. Further, lubricant may not be directed away from undercut groove 306 when it is not received by the lubricant deflector, if the rotating component is rotating at a speed equal or greater to the minimum angular speed. The minimum angular speed may depend on a radius of rotating component 302 and may not depend on an angle between hollow tube 402 and the lubricant deflector (e.g., distribution tube 406).

Additionally, cross sectional view 400 shows a radial profile of undercut groove 306. An axially outer surface of radially outer section 304, closest to first axial side 314 may be maximum radial length 328. An axially inner surface of radially outer section 304, positioned between first axial side 314 and second axial side 316 may be a minimum radial height 424. In this way, an undercut is formed within radially outer section 304 as viewed down the z-axis from first axial side 314. The undercut formed in radially outer section 304 may enable lubricant to be held within undercut groove 306 by the centrifugal force exhibited by rotating rotational component 302 at a speed equivalent or greater than the minimum angular speed.

Turning now to FIG. 5, a front view 500 of lubricant distribution assembly 303 is shown of first axial side 314 as seen through wall 408. As described above, hollow tube 402 may be positioned vertically (along the y-axis) within a bottom portion of lubricant distribution assembly 303 and distribution tube 406 may be positioned vertically within a top portion of lubricant distribution assembly 303. Hollow tube 402 and distribution tube 406 may be fixedly coupled to a support such as wall 408 or housing 410. In this way, hollow tube 402 and distribution tube 406 may remain stationary while rotating component 302 rotates. Distribution tube 406 may be configured to receive lubricant when rotating component 302 rotates in a first direction and may be configured to not receive lubricant oil when rotating in the opposite direction. As one example, the first direction may be a counter-clockwise direction as indicated by arrow 502 and lubricating oil may be continually introduced to undercut groove 306 by hollow tube 402. The lubricating oil may be held within undercut groove 306 and transported by rotating component 302 to distribution tube 406 while an angular speed of rotating component 302 is greater than or equal to a minimum angular speed as calculated by equation 2.

Turning now to FIG. 6A-6B an alternate embodiment of a lubricant distribution assembly 601 is shown. Lubricant distribution assembly 601 may include similar components to lubricant distribution assembly 303 as described above with respect to FIGS. 3-5. Such components will be numbered the same and will not be reintroduced. FIG. 6A shows a front view 600 of lubricant distribution assembly 601 as seen through wall 408. Lubricant distribution assembly 601 may include a baffle 602 positioned even with a top portion of rotating component 302. FIG. 6B shows a perspective view 650 of baffle 602. Similar to distribution 406, baffle 602 may be fixedly coupled to a top edge of wall 408. In this way, baffle 602 may remain stationary while rotating component 302 rotates.

Baffle 602 may be V-shaped. Further, baffle 602 may be shaped as a V-shaped prism and may include a first side 602a and a second side 602b. First side 602a may be opposite second side 602b across the y-axis. Further, first side 602a may be shaped as a mirror image of second side 602b. In this way baffle 602 is symmetric about the y-axis. First side 602a and second side 602b may be curved in a concave direction when viewed along the x-axis. Additionally, baffle 602 may include a first face 612 and a second face positioned opposite first face 612 across the z-axis. First face 612 and the second face may be parallel to first axial side 314. Further a portion of the second face may be spaced away from an axial outer surface of radially outer section 304 by the minimum functional clearance. First side 602a may be configured to collect and distribute lubricating oil as rotating component 302 rotates in a first direction (e.g., a counter-clockwise direction as indicated by arrow 606). Similarly, second side 602b may distribute lubricating oil as rotating component 302 rotates in a second direction (e.g., a clockwise direction as indicated by arrow 608). Rotating component 302, rotating at a speed greater than or equal to the minimum angular speed, may transport lubricating oil from hollow tube 402 to first side 602a or second side 602b of baffle 602, depending on a direction of rotation. Lubricant oil may be propelled along first side 602a or second side 602b and dispersed from a first top edge 606a and a second top edge 606b respectively (with respect to the y-axis) of baffle 602 at a height even with dashed line 604. In one example, a vertical height 614 of baffle 602 may be greater than a maximum radial height of radially outer section 304. In some examples, conveyors may be included in casting of wall 408 to further distribute lubricating oil below dashed line 604.

Turning now to FIG. 6B a perspective view of baffle 602 is shown. First side 602a and second side 602b may be joined at a bottom (with respect to y-axis) edge by a common bottom edge 610. Common bottom edge 610 may be physically coupled to the top portion of wall 408. Common bottom edge 610 may be positioned parallel to the z-axis and perpendicular to first axial side 314. Further, common bottom edge 610 may be positioned vertically between a radially inner edge of radially outer section 304 and a radially outer edge of radially inner section 312. In one embodiment, baffle 602 may be a uniform length with respect to the z-axis.

Turning now to FIG. 7, a method 700 of operating a lubricant distribution assembly such as lubricant distribution assembly 303 or lubricant distribution assembly 601 as described above is shown. In one embodiment, method 700 may be executed during operation of a vehicle such as vehicle 10 of FIG. 1.

At 702, method 700 includes delivering lubricating oil from a lubricant sump to an undercut groove. In one example, the undercut groove may be positioned axially circumferentially around a radially outer section of a rotating component, such as rotating component 302 as described above. In one example, the lubricant sump may be physically separated from the rotating component by a wall. A hollow tube positioned within a bottom section of the wall may fluidly couple the lubricant sump to the undercut groove. Further, delivering lubricant oil to the undercut groove may include delivering lubricating oil to a bottom portion of the lubrication distribution assembly.

At 704, method 700 includes rotating the rotating component clockwise or counter clockwise. In some embodiments an angular speed of the rotating component may be determined by a function of the rotating component within a system (e.g., a transmission such as transmission 16 of FIG. 1). In one example, the rotating component may be rotated at a speed equivalent to or greater than a minimum angular speed. The minimum rotation speed may correspond to a speed at which the centrifugal force holding the lubricating oil within the undercut groove may overcome the gravitational force. In this way, lubricating oil may be transported from a bottom portion of the lubrication distribution assembly to an upper portion of the lubrication distribution assembly.

At 706, method 700 includes receiving lubricant at a lubricant deflector. The lubricant deflector may be positioned within an upper portion of the wall and may remain stationary while the rotating component rotates. The lubricant deflector may be configured to direct lubricant away from the rotating component, thereby distributing oil to other components surrounding the lubricant distribution assembly. In one example the lubricant deflector may be an oil distribution tube, such as distribution tube 406 shown in FIG. 4 or a baffle, such as baffle 602 shown in FIGS. 6A-6B.

At 708, method 700 includes distributing oil from the lubricant distribution assembly. As one example, oil deflected from the lubricant deflector may be distributed to components positioned around the lubricant distribution assembly. Further the lubricant may be distributed from the upper portion of the lubricant distribution assembly, thereby reaching components positioned even with or below the upper portion of the lubricant distribution assembly.

The technical effect of method 700 is to transport lubricant to and distribute lubricant from an upper portion of a lubricant distribution assembly. An undercut groove positioned circumferentially around a rotating component of the lubricant distribution assembly may be configured to transport the lubricant while the rotating component rotates a minimum angular speed. The undercut groove may allow the minimum angular speed to be decreased when compared with a minimum angular speed of a rotational component without an undercut groove. In this way, lubricant may be distributed more accurately and an amount of excess oil distributed by the lubricant distribution assembly may be decreased. Further, lubricant may reach components at a further distance from the rotating component of the lubricant distribution assembly without spraying excess lubricant in areas where there are no components. Such even distribution of a sufficient but not excessive amount of lubricant may increase an overall efficiency of the system of including the lubricant distribution assembly and decrease degradation to the components of the system lubricated by the lubricant distribution assembly.

The disclosure also provides support for a lubricant distribution assembly, comprising: a rotating component with a recessed area, the recessed area axially circumferentially surrounded by a radially outer section, wherein a radially inner side of the radially outer section forms a surface of an undercut groove, a lubricant sump separated from the rotating component by a wall, a hollow tube that delivers a lubricant from the lubricant sump to a lower portion of the lubricant distribution assembly with respect to gravity, and a lubricant deflector positioned within an upper portion of the lubricant distribution assembly with respect to gravity, wherein the lubricant deflector lies in a plane that is parallel to a first axial side of the rotating component. In a first example of the system, the undercut groove is U-shaped. In a second example of the system, optionally including the first example, the rotating component is a gear of a transmission. In a third example of the system, optionally including one or both of the first and second examples, the wall is a sole barrier between the lubricant sump and the rotating component. In a fourth example of the system, optionally including one or more or each of the first through third examples, the lubricant deflector is V-shaped or tube-shaped. In a fifth example of the system, optionally including one or more or each of the first through fourth examples, the V-shaped lubricant deflector is configured to receive lubricant when the rotating component rotates in a first direction or a second direction. In a sixth example of the system, optionally including one or more or each of the first through fifth examples, the tube-shaped lubricant deflector is configured to receive lubricant from when the rotating component rotates in a first direction. In a seventh example of the system, optionally including one or more or each of the first through sixth examples, a maximum radial depth of the undercut groove is between one half and one third a maximum radial length of the radially outer section.

The disclosure also provides support for a method of distributing lubricant, comprising: delivering lubricant from a lubricant sump to an undercut groove of a rotating component of a lubricant distribution assembly via a hollow tube positioned within a lower portion of the lubricant distribution assembly, transporting the lubricant from the lower portion of lubricant distribution assembly to an upper portion of the lubricant distribution assembly by rotating the rotating component at a speed greater than or equal to a minimum angular speed, and distributing lubricant away from the lubricant distribution assembly by directing the lubricant to a lubricant deflector positioned within the upper portion of the lubricant distribution assembly. In a first example of the method, the lubricant sump is separated from the rotating component by a wall. In a second example of the method, optionally including the first example, rotating the rotating component includes rotating clockwise and/or counter-clockwise. In a third example of the method, optionally including one or both of the first and second examples, the minimum angular speed does not depend on a position of the hollow tube. In a fourth example of the method, optionally including one or more or each of the first through third examples, the hollow tube and the lubricant deflector are stationary while the rotating component rotates. In a fifth example of the method, optionally including one or more or each of the first through fourth examples, the rotating component is a gear positioned in a gearbox of a transmission. In a sixth example of the method, optionally including one or more or each of the first through fifth examples, the minimum angular speed is a speed where a centrifugal force acting on the lubricant is greater than a gravitational force acting on the lubricant.

The disclosure also provides support for a lubricant distribution assembly, comprising: a rotating component including an undercut groove configured to receive lubricant, a hollow tube configured to deliver the lubricant to the undercut groove, a baffle positioned within an upper portion of the lubricant distribution assembly with respect to gravity and configured to receive the lubricant from the undercut groove, wherein, the baffle is shaped as a V-shaped prism including a bottom edge positioned perpendicular to a recessed area of the rotating component. In a first example of the system, the baffle is symmetric about a y-axis, the y-axis parallel with a gravitational axis. In a second example of the system, optionally including the first example, a first side and a second side of the baffle are concave when viewed along an x-axis. In a third example of the system, optionally including one or both of the first and second examples, the baffle is configured to distribute lubricant at a height even with a top edge of the baffle. In a fourth example of the system, optionally including one or more or each of the first through third examples, a face of the baffle is spaced away from a radially outer section of the rotating component by a minimum functional clearance.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" component or "a first" component or the equivalent thereof. Such claims should be understood to include incorporation of one or more such components, neither requiring nor excluding two or more such components. Other combinations and sub-combinations of the disclosed features, functions, components, and/or properties may be claimed through amendment of the present claims or through presentation of new claims in this or a related application. Such claims, whether broader, narrower, equal, or different in scope to the original claims, also are regarded as included within the subject matter of the present disclosure.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

FIGS. 2-6B are shown to scale, although other relative dimensions may be used, if desired.

FIGS. 2-6B show example configurations with relative positioning of the various components. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components laying in face-sharing contact with each other may be referred to as in face-sharing contact. As another example, components positioned apart from each other with only a space therebetween and no other components may be referred to as such, in at least one example. As yet another example, components shown above/below one another, at opposite sides to one another, or to the left/right of one another may be referred to as such, relative to one another. Further, as shown in the figures, a topmost component or point of component may be referred to as a "top" of the component and a bottommost component or point of the component may be referred to as a "bottom" of the component, in at least one example. As used herein, top/bottom, upper/lower, above/below, may be relative to a vertical axis of the figures and used to describe positioning of components of the figures relative to one another. As such, components shown above other components are positioned vertically above the other components, in one example.

The invention claimed is:

1. A method of distributing lubricant, comprising:
delivering lubricant from a lubricant sump to an undercut groove of a rotating component of a lubricant distribution assembly via a hollow tube positioned within a lower portion of the lubricant distribution assembly;
transporting the lubricant from the lower portion of lubricant distribution assembly to an upper portion of the lubricant distribution assembly by rotating the rotating component at a speed greater than or equal to a minimum angular speed; and
distributing lubricant away from the lubricant distribution assembly by directing the lubricant to a lubricant deflector positioned within the upper portion of the lubricant distribution assembly,
wherein the rotating component includes a recessed area, the recessed area axially circumferentially surrounded by a radially outer section, wherein a radially inner side of the radially outer section forms a surface of the undercut groove, wherein the lubricant sump is separated from the rotating component by a wall, wherein the hollow tube delivers the lubricant from the lubricant sump to the lower portion of the lubricant distribution assembly with respect to gravity, wherein a lubricant deflector is positioned within an upper portion of the lubricant distribution assembly with respect to gravity, wherein the lubricant deflector lies in a plane that is parallel to a first axial side of the rotating component, wherein the rotating component is a gear of a transmission coupled to an electric motor, wherein the wall is a sole barrier between the lubricant sump and the rotating component, wherein the undercut groove is U-shaped, and wherein the lubricant deflector is V-shaped or tube-shaped.

2. The method of claim 1, wherein rotating the rotating component includes rotating clockwise and/or counterclockwise.

3. The method of claim 1, wherein the minimum angular speed does not depend on a position of the hollow tube.

4. The method of claim 1, wherein the hollow tube and the lubricant deflector are stationary while the rotating component rotates.

5. The method of claim 1, wherein the rotating component is a gear positioned in a gearbox of a transmission.

6. The method of claim 1, wherein the minimum angular speed is a speed where a centrifugal force acting on the lubricant is greater than a gravitational force acting on the lubricant.

* * * * *